(12) United States Patent
Uchimura et al.

(10) Patent No.: US 10,944,951 B2
(45) Date of Patent: Mar. 9, 2021

(54) INFORMATION PROCESSING APPARATUS, INFORMATION PROCESSING METHOD, AND A RECORDING MEDIUM

(71) Applicant: SONY CORPORATION, Tokyo (JP)

(72) Inventors: Kouichi Uchimura, Kanagawa (JP); Ryohei Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 460 days.

(21) Appl. No.: 15/519,456

(22) PCT Filed: Oct. 9, 2015

(86) PCT No.: PCT/JP2015/078740
§ 371 (c)(1),
(2) Date: Apr. 14, 2017

(87) PCT Pub. No.: WO2016/063746
PCT Pub. Date: Apr. 28, 2016

(65) Prior Publication Data
US 2017/0244947 A1 Aug. 24, 2017

(30) Foreign Application Priority Data
Oct. 23, 2014 (JP) .............................. JP2014-216218

(51) Int. Cl.
*H04N 9/87* (2006.01)
*H04N 5/92* (2006.01)
(Continued)

(52) U.S. Cl.
CPC .............. *H04N 9/87* (2013.01); *G11B 20/10* (2013.01); *H04N 5/92* (2013.01); *H04N 5/9202* (2013.01);
(Continued)

(58) Field of Classification Search
CPC .......... H04N 9/87; H04N 19/70; H04N 19/85; H04N 5/92; G11B 20/10
See application file for complete search history.

(56) References Cited

U.S. PATENT DOCUMENTS 6,483,945 B1 * 11/2002 Kato .................... H04N 21/434
348/699
2005/0218295 A1 * 10/2005 Nakamura ............. H04N 5/235
250/208.1
(Continued)

FOREIGN PATENT DOCUMENTS

CA 2914986 A1 12/2014
CA 2914992 A1 12/2014
(Continued)

OTHER PUBLICATIONS

Extended European Search Report of EP Application No. 15852888. 5, dated May 16, 2018, 7 pages of ISRWO.
(Continued)

*Primary Examiner* — Mishawn N. Hunter
(74) *Attorney, Agent, or Firm* — Chip Law Group

(57) ABSTRACT

The present disclosure relates to an information processing apparatus, an information processing method and a program as well as a recording medium for enabling at least a bit rate of an image to be reproduced to be converted. A BD-J execution unit sets conversion equation information indicating a conversion equation for converting at least a bit rate of a graphics to be reproduced. A conversion unit converts at least the bit rate of the graphics to be reproduced by use of the conversion equation indicated by the conversion equation information set by the BD-J execution unit. The present disclosure can be applied to a reproducing apparatus and the like for reproducing an optical disc recording therein a stream file of AV stream of main video in a video format (Continued)

different in bit rate or color gamut, a BDJO file, a file of BD-J, and the like.

17 Claims, 13 Drawing Sheets

(51) Int. Cl.
*H04N 19/70* (2014.01)
*H04N 13/00* (2018.01)
*H04N 19/85* (2014.01)
*G11B 20/10* (2006.01)

(52) U.S. Cl.
CPC ........... *H04N 5/9206* (2013.01); *H04N 13/00* (2013.01); *H04N 19/70* (2014.11); *H04N 19/85* (2014.11)

(56) References Cited

U.S. PATENT DOCUMENTS

| | | | |
|---|---|---|---|
| 2009/0180689 A1* | 7/2009 | Komiya | H04N 1/603 382/167 |
| 2009/0304072 A1* | 12/2009 | Ikehara | H04N 21/23406 375/240.02 |
| 2014/0125696 A1* | 5/2014 | Newton | H04N 5/4403 345/629 |
| 2015/0103919 A1* | 4/2015 | Hattori | H04N 19/124 375/240.25 |
| 2016/0173845 A1 | 6/2016 | Uchimura et al. | |
| 2016/0191883 A1 | 6/2016 | Uchimura et al. | |
| 2017/0163950 A1 | 6/2017 | Uchimura et al. | |
| 2018/0035093 A1 | 2/2018 | Uchimura et al. | |

FOREIGN PATENT DOCUMENTS

| | | |
|---|---|---|
| CN | 105324988 A | 2/2016 |
| CN | 105340261 A | 2/2016 |
| EP | 3016378 A1 | 5/2016 |
| EP | 3016379 A1 | 5/2016 |
| EP | 3193335 A1 | 7/2017 |
| JP | 2007-257641 A | 10/2007 |
| JP | 2012-085206 A | 4/2012 |
| JP | 2015-008360 A | 1/2015 |
| KR | 10-2016-0024856 A | 3/2016 |
| KR | 10-2016-0024857 A | 3/2016 |
| PH | 12015502760 A | 3/2016 |
| TW | 201519226 A | 5/2015 |
| WO | 2012/172460 A1 | 12/2012 |
| WO | 2013/046096 A1 | 4/2013 |
| WO | 2014/208344 A1 | 12/2014 |
| WO | 2014/208345 A1 | 12/2014 |
| WO | 2016/039171 A1 | 3/2016 |

OTHER PUBLICATIONS

Office Action for JP Patent Application No. 2016-555177, dated Oct. 1, 2019, 05 pages of Office Action and 04 pages of translation.

* cited by examiner

FIG. 3

| Syntax | No. of bits | Mnemonic |
|---|---|---|
| xxxxx.bdjo{ | | |
|   type_indicator | 8*4 | bslbf |
|   version_number | 8*4 | bslbf |
|   TerminalInfo_start_address | 32 | uimsbf |
|   AppCacheInfo_start_address | 32 | uimsbf |
|   TableOfAccessiblePlayLists_start_address | 32 | uimsbf |
|   ApplicationManagementTable_start_address | 32 | uimsbf |
|   KeyInterestTable_start_address | 32 | uimsbf |
|   FileAccessInfo_start_address | 32 | uimsbf |
|   reserved_for_future_use | 128 | bslbf |
|   TerminalInfo() | | |
|   AppCacheInfo() | | |
|   TableOfAccessiblePlayLists() | | |
|   ApplicationManagementTable() | | |
|   KeyInterestTable() | | |
|   FileAccessInfo() | | |
| } | | |

FIG. 4

| TerminalInfo() { | bits | Mnemonic |
|---|---|---|
| ... | | |
| initial_HAVi_configuration_id | 4 | bslbf |
| initial_frame_rate | 4 | bslbf |
| initial_dynamic_range | 1 | bslbf |
| initial_bitdepth | 1 | bslbf |
| initial_color_space | 1 | bslbf |
| initial_EOTF | 8 | bslbf |
| initial_diffuse_white | 8 | bslbf |
| reserved | 7 | bslbf |
| } | | |

| initial_HAVi_configuration_id | |
|---|---|
| 0 | reserved |
| 1 | 1920x1080 |
| ... | ... |
| 6 | 960x540 |
| 7 | UHD |

FIG. 5A

| initial_dynamic_range | |
|---|---|
| 0 | SDR |
| 1 | HDR |

FIG. 5B

| initial_bitdepth | |
|---|---|
| 0 | 8bit |
| 1 | 10bit |

FIG. 5C

| initial_color_space | |
|---|---|
| 0 | 709 |
| 1 | 2020 |

FIG. 5D

| initial_EOTF | |
|---|---|
| 0 | Gamma |
| 1 | Pq |
| 2 | EOTF #1 |
| ... | ... |
| 255 | reserved |

FIG. 5E

| initial_diffuse_white | |
|---|---|
| 0 | |
| 1 | |
| 2 | |
| ... | ... |
| 100 | |
| ... | reserved |

1. org.blurayx.uhd.ui#EOTF CLASS
   org.blurayx.uhd.ui#EOTF#Gamma
   org.blurayx.uhd.ui#EOTF#PQ 2. org.blurayx.uhd.ui#HGraphicsConfigurationTemplateUHD CLASS
   (WHERE, TAKING OVER org.blurayx.uhd.ui#HGraphicsConfigurationTemplate CLASS)
   HAVING setPreference (EOTF, EOTF#Gamma/#PQ, REQUIRED) FUNCTION AND getPreference (EOTF) FUNCTION
   HAVING setDiffuseWhite (float diffusewhite) FUNCTION AND getDiffuseWhite () FUNCTION
   org.blurayx.uhd.ui#HVideoConfigurationTemplateUHD CLASS
   org.blurayx.uhd.ui#HBackgroundConfigurationTemplateUHD CLASS

INFORMATION PROCESSING APPARATUS, INFORMATION PROCESSING METHOD, AND A RECORDING MEDIUM

CROSS REFERENCE TO RELATED APPLICATIONS

This application is a U.S. National Phase of International Patent Application No. PCT/JP2015/078740 filed on Oct. 9, 2015, which claims priority benefit of Japanese Patent Application No. JP 2014-216218 filed in the Japan Patent Office on Oct. 23, 2014. Each of the above-referenced applications is hereby incorporated herein by reference in its entirety.

TECHNICAL FIELD

The present disclosure relates to an information processing apparatus, an information processing method, and a program as well as a recording medium, and particularly to an information processing apparatus, an information processing method, and a program as well as a recording medium for enabling at least a bit rate of an image to be reproduced to be converted.

BACKGROUND ART

Blu-ray Disc Association (BDA) has established the Blu-ray (trademark) disc (BD) standard. BD can record therein main video, speech, navigation program called Blu-ray Disc Java (BD-J) (trademark), and the like (see Patent Document 1, for example). A reproducing apparatus executes BD-J thereby to control reproduction of main video or speech recorded in BD or to generate and display a graphics that is an image such as menu button or game image.

At present, BDA is establishing the ultra high definition (UHD) BD standard. Introduction of the following seven video formats is being considered according to the UHD BD standard.

(1) AVC 1920×1080 BT.709, SDR 8bit
(2) HEVC 1920×1080 BT.709, SDR 10bit
(3) HEVC 1920×1080 BT.2020 SDR 10bit
(4) HEVC 1920×1080 BT.2020 HDR 10bit
(5) HEVC 3840×2160 BT.709 SDR 10bit
(6) HEVC 3840×2160 BT.2020 SDR 10bit
(7) HEVC 3840×2160 BT.2020 HDR 10bit Note that (1) to (7) are described in order of coding system, resolution, color gamut standard, dynamic range, and bit rate in each video format.

That is, the video formats (1) to (7) employ a coding system of advanced video coding (AVC) system or high efficiency video coding (HEVC) system. Further, a resolution of 1920×1080 pixels or 3840×2160 pixels is employed, and color gamut of BT.709 or BT.2020 is employed. Furthermore, a dynamic range of SDR or HDR is employed, and a bit rate of 8 bits or 10 bits is employed.

CITATION LIST

Patent Document

Patent Document 1: Japanese Patent Application Laid-Open No. 2012-085206

SUMMARY OF THE INVENTION

Problems to be Solved by the Invention

However, a dynamic range of a graphics generated by executing BD-J is SDR (sRGB), and a bit rate thereof is 8 bits. Thus, in a case where a main video format of a video is any of (2) to (7) described above, the reproducing apparatus needs to convert at least the bit rate.

The present disclosure has been made in terms of such a situation, and is directed for converting at least a bit rate of an image to be reproduced.

Solutions to Problems

An information processing apparatus according to a first aspect of the present disclosure is an information processing apparatus including: a setting unit configured to set conversion equation information indicating a conversion equation for converting at least a bit rate of an image to be reproduced; and a conversion unit configured to convert at least the bit rate of the image to be reproduced by use of the conversion equation indicated by the conversion equation information set by the setting unit.

An information processing method and a program according to the first aspect of the present disclosure correspond to the information processing apparatus according to the first aspect of the present disclosure.

According to the first aspect of the present disclosure, conversion equation information indicating a conversion equation for converting at least a bit rate of an image to be reproduced is set, and at least the bit rate of the image to be reproduced is converted by use of the conversion equation indicated by the set conversion equation information.

A recording medium according to a second aspect of the present disclosure is a recording medium which records therein information for instructing to set conversion equation information indicating a conversion equation for converting at least a bit rate of an image to be reproduced, is mounted on an information processing apparatus, and is reproduced, the recording medium causing the information processing apparatus having acquired the information to set the conversion equation information of the image to be reproduced and to convert at least the bit rate of the image to be reproduced by use of the conversion equation indicated by the set conversion equation information.

According to the second aspect of the present disclosure, information for instructing to set conversion equation information on a conversion equation for converting at least a bit rate of an image to be reproduced is recorded.

An information processing apparatus according to a third aspect of the present disclosure is an information processing apparatus including: a generation unit configured to generate a file including information for instructing to set conversion equation information indicating a conversion equation for converting at least a bit rate of an image to be reproduced.

According to the third aspect of the present disclosure, a file including information for instructing to set conversion equation information indicating a conversion equation for converting at least a bit rate of an image to be reproduced is generated.

Effects of the Invention

According to the first aspect of the present disclosure, an image can be converted. Further, according to the first aspect of the present disclosure, at least a bit rate of an image to be reproduced can be converted.

Further, according to the second aspect of the present disclosure, an image can be converted. Furthermore, according to the second aspect of the present disclosure, at least a bit rate of an image to be reproduced can be converted.

Moreover, according to the third aspect of the present disclosure, a file can be generated. Further, according to the third aspect of the present disclosure, a file including information for instructing to set conversion equation information indicating a conversion equation for converting at least a bit rate of an image to be reproduced can be generated.

Additionally, the effects described herein are not necessarily limited, and any effect described in the present disclosure can be obtained.

BRIEF DESCRIPTION OF DRAWINGS

FIG. 3 is a diagram illustrating an exemplary syntax of a BDJO file.

FIG. 4 is a diagram illustrating an exemplary syntax of TerminalInfo.

FIGS. 5A, 5B, 5C, 5D, 5E, and 5F are diagrams illustrating exemplary initial values included in TerminalInfo.

FIG. 7 is a diagram for explaining extended classes of application programming interface (API) of BD-J.

MODE FOR CARRYING OUT THE INVENTION

Modes for carrying out the present disclosure (which will be denoted as embodiment) will be described below. Note that the description will be made in the following order.

1. First embodiment: recording/reproducing system (FIG. 1 to FIG. 12)
2. Second embodiment: computer (FIG. 13)

<First Embodiment>

(Exemplary Configuration of Embodiment of Recording/Reproducing System)

Figure 1:
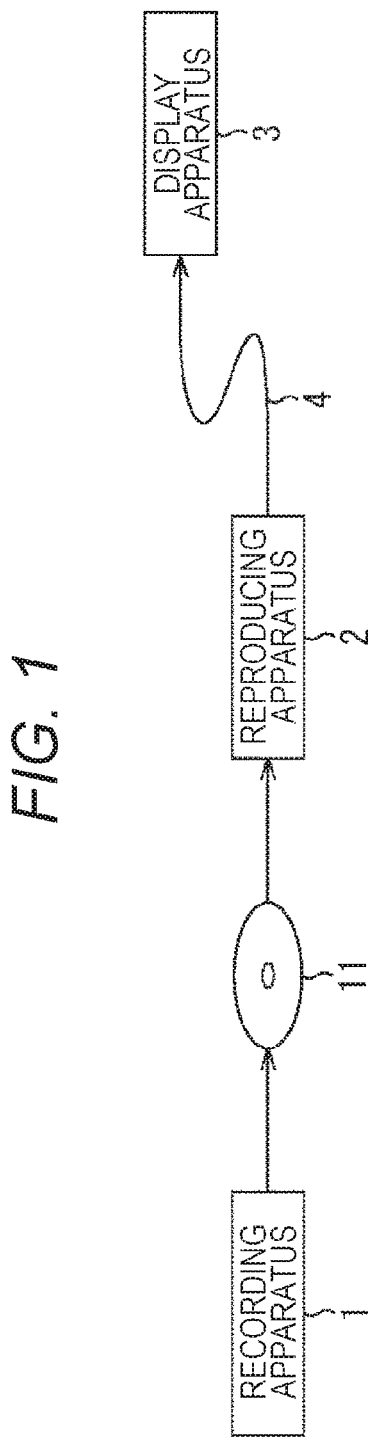
FIG. 1 is a block diagram illustrating an exemplary configuration of one embodiment of a recording/reproducing system to which the present disclosure is applied.

FIG. 1 is a block diagram illustrating an exemplary configuration of one embodiment of a recording/reproducing system to which the present disclosure is applied.

The recording/reproducing system of FIG. 1 is configured of a recording apparatus 1, a reproducing apparatus 2, and a display apparatus 3, and can handle images in the seven video formats (which will be denoted as UHD formats below) described above. The reproducing apparatus 2 and the display apparatus 3 are connected with each other via a high definition multimedia interface (HDMI) (trademark) cable 4. The reproducing apparatus 2 and the display apparatus 3 may be connected with each other via a cable in other standard, or may be connected with each other via wireless communication.

The recording apparatus (information processing apparatus) 1 records therein contents such as main video, speech and BD-J in UHD formats, and the reproducing apparatus 2 (information processing apparatus) executes BD-J thereby to reproduce main video or speech or to generate a graphics or background image. A background image processing is similar to a graphics processing, and thus a description thereof will be omitted as needed.

Contents are provided from the recording apparatus 1 to the reproducing apparatus 2 by use of an optical disc 11 mounted on the recording apparatus 1 and the reproducing apparatus 2. The optical disc 11 records contents therein in a format conforming to a BD-read only memory (ROM) format, for example.

Contents may be recorded in the optical disc 11 in a format conforming to other format such as BD-R or -RE. Further, contents may be provided from the recording apparatus 1 to the reproducing apparatus 2 by use of a removable medium other than an optical disc, such as a memory card mounting a flash memory thereon.

In a case where the optical disc 11 is a BD-ROM disc, the recording apparatus 1 is used by an author of the contents, for example. The description will be made below, as needed, assuming that the optical disc 11 in which contents are recorded by the recording apparatus 1 is provided to the reproducing apparatus 2, but actually optical discs are duplicated on the basis of a master disc in which contents are recorded by the recording apparatus 1, and one optical disc 11 among them is provided to the reproducing apparatus 2.

Contents such as main video, speech and BD-J in UHD formats are input into the recording apparatus 1. The recording apparatus 1 encodes and multiplexes the main video and speech in the UHD formats thereby to generate an AV stream as a transport stream (TS). The recording apparatus 1 (generation unit) records the generated AV stream, BD-J, and the like in the optical disc 11.

The reproducing apparatus 2 drives a drive and reads the AV stream recorded in the optical disc 11. The reproducing apparatus 2 separates and decodes the AV stream into a main video AV stream and a speech AV stream. The reproducing apparatus 2 executes BD-J thereby to generate a graphics with a dynamic range of SDR and a bit rate of 8 bits. Incidentally, it is assumed herein that the format of the generated graphics other than dynamic range and bit rate is the same as the main video UHD format.

In a case where the dynamic range of the main video UHD format is HDR or the bit rate thereof is 10 bits, the reproducing apparatus 2 converts the dynamic range or the bit rate of the graphics to be the same dynamic range and bit rate as the main video. The reproducing apparatus 2 combines the main video obtained by the decoding with the graphics in the same UHD format as the main video, and transmits a combined image to the display apparatus 3. Further, the reproducing apparatus 2 transmits the speech obtained by the decoding to the display apparatus 3.

The display apparatus 3 receives the combined image transmitted from the reproducing apparatus 2, and displays it on a monitor (not illustrated). Further, the display apparatus 3 receives the speech transmitted from the reproducing apparatus 2, and outputs it from a speaker (not illustrated).

(Directory Structure)

Figure 2:
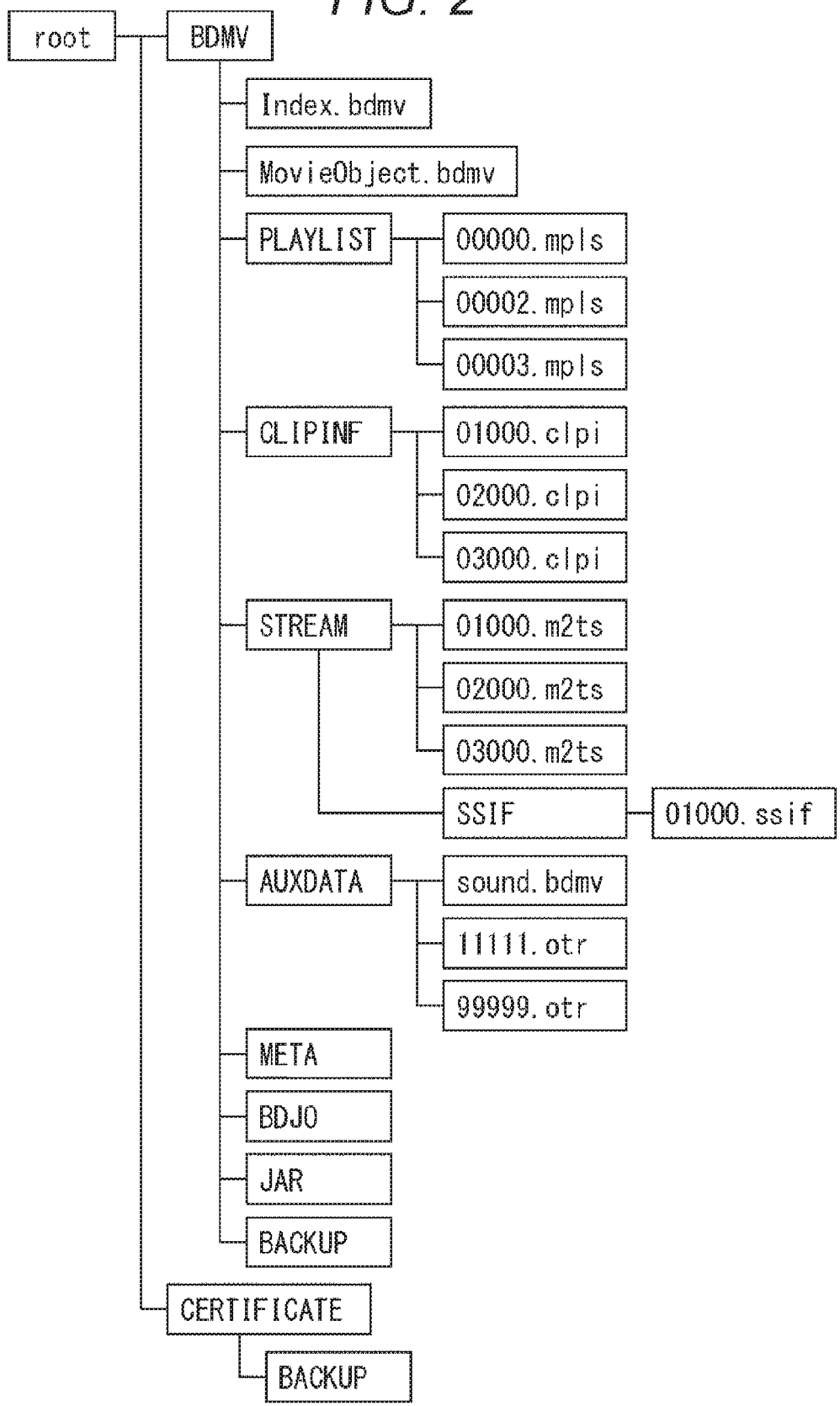
FIG. 2 is a diagram illustrating an exemplary management structure of files recorded in an optical disc of FIG. 1.

FIG. 2 is a diagram illustrating an exemplary management structure of files recorded in the optical disc 11 of FIG. 1.

Each file recorded in the optical disc 11 is managed in the directory structure in a hierarchy manner. One root directory is created on the optical disc 11.

A BDMV directory and a CERTIFICATE directory are placed under the root directory.

An Index file set with a name of "Index.bdmv" and a Movie Object file set with a name of "MovieObject.bdmv" are stored under the BDMV directory.

The Index file describes therein, for example, a list of title numbers recorded in the optical disc 11, and the types and numbers of objects executed corresponding to the title numbers. The object types include a movie object and a BD-J object.

The movie object describes therein a navigation command used for reproducing PlayList, or the like. The BD-J object describes therein BD-J. The Movie Object file describes therein a movie object.

A PLAYLIST directory, a CLIPINF directory, a STREAM directory, a BDJO file, a JAR file, and the like are provided under the BDMV directory.

The PLAYLIST directory stores therein a PlayList file describing therein PlayList used as reproduction management information for managing reproduction of an AV stream. Each PlayList file is set with a name in a combination of 5-digit number and extension of ".mpls." One Playlist file illustrated in FIG. 2 is set with a file name of "00000.mpls."

The CLIPINF directory stores therein information on an AV stream in a predetermined unit as Clip Information file. Each Clip Information file is set with a name in a combination of 5-digit number and extension of "clpi." The three Clip Information files in FIG. 2 are set with the file names of "01000.clpi," "02000.clpi," and "03000.clpi," respectively.

The STREAM directory stores therein an AV stream in a predetermined unit as stream file. Each stream file is set with a name in a combination of 5-digit number and extension of ".m2ts." The three stream files in FIG. 2 are set with the file names of "01000.m2ts," "02000.m2ts," and "03000.m2ts," respectively.

A Clip Information file and a stream file set with the file names with the same 5-digit number configure one Clip. Then, when the stream file with a file name of "01000.m2ts" configuring one Clip is reproduced, the Clip Information file with a file name of "01000.clpi" configuring the Clip is used.

The BDJO file is a static database file, and describes therein information for specifying an initially-activated class of BD-J with a corresponding title and a JAR file with a corresponding title. The JAR file is a compressed file incorporating a plurality of files of BD-J and the like therein.

The reproducing apparatus 2 specifies a title object to be reproduced with reference to the Index file. In a case where the title object to be reproduced is a BD-J object, the reproducing apparatus 2 reads the BDJO file of the BD-J object, and executes the file of BD-J incorporated in the JAR file specified by the BDJO file. Thereby, the reproducing apparatus 2 performs generation and display of a graphics, reproduction of main video or speech according to PlayList, network connection, storage access, and the like.

A certificate for certificating certainty of a signature attached to the Jar file is stored as CERTIFICATE file (not illustrated) under the CERTIFICATE directory.

(Exemplary Syntax of BDJO File)

FIG. 3 is a diagram illustrating an exemplary syntax of a BDJO file.

As illustrated in FIG. 3, the BDJO file (xxxxx.bdjo) describes therein TerminalInfo including an initial value of information on a screen with a corresponding title, and the like.

(Exemplary syntax of TerminalInfo)

FIG. 4 is a diagram illustrating an exemplary syntax of TerminalInfo, and FIGS. 5A, 5B, 5C, 5D, 5E, and 5F are diagrams illustrating exemplary initial values included in TerminalInfo.

As illustrated in FIG. 4, TerminalInfo describes therein 4-bit initial_HAVi_configuration_id indicating an initial value of a resolution of a screen with a corresponding title.

As illustrated in FIG. 5A, initial_HAVi_configuration_id is 1 for an initial value of full high definition (FHD) of 1920×1080 pixels, and is 6 for an initial value of quarter high definition (QHD) of 960×540 pixels. Further, initial_HAVi_configuration_id is 7 for an initial value of a 4k resolution of 3840×2160 pixels.

Further, TerminalInfo describes therein 1-bit initial_dynamic_range indicating an initial value of a dynamic range of the screen with the corresponding title. As illustrated in FIG. 5B, initial_dynamic_range is 0 for an initial value of SDR, and is 1 for an initial value of HDR.

Further, TerminalInfo describes therein 1-bit initial_bitdepth indicating an initial value of a bit rate of the screen with the corresponding title. As illustrated in FIG. 5C, initial_bitdepth is 0 for an initial value of 8 bits, and is 1 for an initial value of 10 bits. A value of initial_bitdepth is assigned to a possible bit rate herein, but initial_bitdepth may be defined as field and a bit rate itself may be assumed as a value of initial_bitdepth.

Furthermore, TerminalInfo describes therein 1-bit initial_color_space indicating an initial value of color gamut of the screen with the corresponding title. As illustrated in FIG. 5D, initial_color_space is 0 for an initial value of BT.709, and is 1 for an initial value of BT.2020.

Further, TerminalInfo describes therein 1-bit initial_E-OTF indicating an initial value of conversion equation information on a conversion equation for converting at least a bit rate of the screen with the corresponding title. The conversion equation information specifically indicates a type of electro-optical transfer function (EOTF) of a screen used for generating a conversion equation for converting at least a bit rate of the screen. The EOTF type is Gammma, PQ, or the like, for example.

As illustrated in FIG. 5E, initial_EOTF is 0 for an initial value of Gammma, and is 1 for an initial value of PQ. Further, initial_EOTF is 2 for EOTF #1 as EOTF type other than Gammma and PQ. As described above, EOTF types other than Gammma and PQ are present, but two EOTF types of Gammma and PQ are assumed below for convenient description.

Further, TerminalInfo describes therein 1-bit initial_diffuse white indicating an initial value of maximum luminance information on maximum luminance of the screen with the corresponding title. The maximum luminance information is a rate (%) of the maximum luminance of the screen relative to the maximum luminance of HDR, for example, and initial_diffuse white may take a value between 0 and 100 as illustrated in FIG. 5F.

(Description of Planes)

Figure 6:
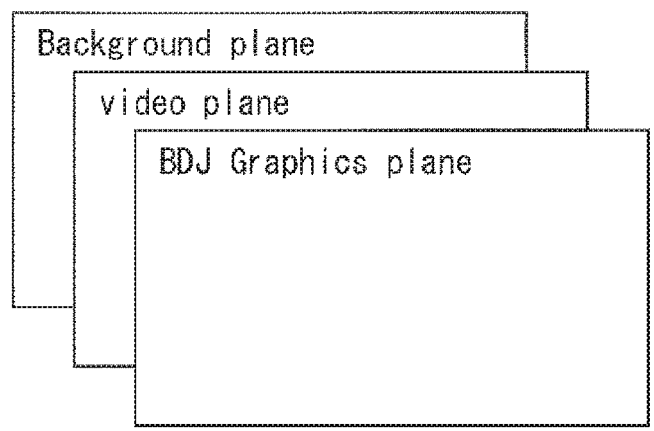
FIG. 6 is a diagram for explaining planes configuring a screen.

FIG. 6 is a diagram for explaining planes configuring a screen generated by executing a file of BD-J.

A screen generated by executing a file of BD-J is called HScreen, and HScreen is configured of BDJ Graphics Plane, Video Plane, and Background Plane as illustrated in FIG. 6.

BDJ Graphics Plane is configured of one screen of graphics, Video Plane is configured of one screen of main video, and Background Plane is configured of one screen of background image.

In the recording/reproducing system not capable of handling images in the UHD formats, reproduction of BDJ Graphics Plane is controlled by use of an org.blurayx.uhd.ui#HGraphicsDevice class, an org.blurayx.uhd.ui#HGraphicsConfiguration class, and an org.blurayx.uhd.ui#HGraphicsConfigurationTemplate class of a file of BD-J.

Specifically, a resolution of BDJ Graphics Plane, information on whether BDJ Graphics Plane is a 2D image or 3D image, and the like are set by executing BD-J using the org.blurayx.uhd.ui#HGraphicsConfigurationTemplate class. Then, the set information is collected as information on reproduction of BDJ Graphics Plane by executing BD-J using the org.blurayx.uhd.ui#HGraphicsConfiguration class. Then, the collected information is set as information on reproduction of BDJ Graphics Plane by executing BD-J using the org.blurayx.uhd.ui#HGraphicsDevice class.

Reproduction of Video Plane is controlled by executing BD-J using an org.blurayx.uhd.ui#HVideoDevice class, an org.blurayx.uhd.ui#HVideoConfiguration class, and an org.blurayx.uhd.ui#HVideoConfigurationTemplate class of a file of BD-J similarly to reproduction of BDJ Graphics Plane. Further, reproduction of Background Plane is controlled by executing BD-J using an org.blurayx.uhd.ui#HBackgroundDevice class, an org.blurayx.uhd.ui#HBackgroundConfiguration class, and an org.blurayx.uhd.ui#HBackgroundConfigurationTemplate class similarly to reproduction of BDJ Graphics Plane.

On the other hand, in the recording/reproducing system of FIG. 1 capable of handling images in the UHD formats, the reproducing apparatus 2 needs to convert at least a bit rate of a graphics or background image. However, the classes described above cannot cause the reproducing apparatus 2 to execute the processing of setting and acquiring conversion equation information or maximum luminance information required for conversion. Thus, the classes for BD-J required for executing the processing are extended.

(Extended Classes of BD-J)

FIG. 7 is a diagram for explaining extended classes of API of BD-J in the recording/reproducing system of FIG. 1.

As illustrated in FIG. 7, an org.blurayx.uhd.ui#EOTF class expressing an EOTF type indicated by conversion equation information is newly defined as a class of API of BD-J in the recording/reproducing system of FIG. 1. The org.blurayx.uhd.ui#EOTF class expresses whether the EOTF type is Gamma or PQ. The org.blurayx.uhd.ui#EOTF#Gamma indicates that EOTF is Gamma, and the org.blurayx.uhd.ui#EOTF#PQ indicates that EOTF is PQ.

Further, an org.blurayx.uhd.ui#HGraphicsConfigurationTemplateUHD class is newly defined as a class of API of BD-J in the recording/reproducing system of FIG. 1. The org.blurayx.uhd.ui#HGraphicsConfigurationTemplateUHD class is directed for setting and acquiring conversion equation information and maximum luminance information in addition to the function of the org.blurayx.uhd.ui#HGraphicsConfigurationTemplate class. That is, the org.blurayx.uhd.ui#HGraphicsConfigurationTemplateUHD class has (takes over) the function of the org.blurayx.uhd.ui#HGraphicsConfigurationTemplate class. Then, in the org.blurayx.uhd.ui#HGraphicsConfigurationTemplateUHD class, org.blurayx.uhd.ui#EOTF can be newly described as property, and a setPreference(EOTF, EOTF#Gamma/#PQ, REQUIRED) function and a getPreference(EOTF) function can be described.

"EOTF#Gamma/#PQ" in the setPreference(EOTF, EOTF#Gamma/#PQ, REQUIRED) function indicates that a setting value of a corresponding plane to be reproduced is Gamma or PQ. Further, "setPreference(EOTF, . . . , REQUIRED)" is a description for instructing to set conversion equation information of the plane to be reproduced as the setting value.

The getPreference(EOTF) function is a description for instructing to acquire org.blurayx.uhd.ui#EOTF#Gamma or org.blurayx.uhd.ui#EOTF#PQ indicating currently-set conversion equation information of the corresponding plane to be reproduced.

Further, in the org.blurayx.uhd.ui#HGraphicsConfigurationTemplateUHD class, a setDiffuseWhite (float diffusewhite) function and a getDiffuseWhite ( ) function can be described. "float diffusewhite" in the setDiffuseWhite(float diffusewhite) is a setting value of maximum luminance information of the corresponding plane to be reproduced. Further "setDiffuseWhite" is a description for instructing to set the setting value. For example, a description for instructing to set the setting value of the maximum luminance information at 73 is setDiffuseWhite(0.73f).

The getDiffuseWhite( ) function is a description for instructing to acquire currently-set maximum luminance information of the corresponding plane to be reproduced.

Similarly, a g.blurayx.uhd.ui#HVideoConfigurationTemplateUHD class for setting and acquiring conversion equation information and maximum luminance information of Video Plane and an org.blurayx.uhd.ui#HBackgroundConfigurationTemplateUHD class for setting and acquiring conversion equation information and maximum luminance information of Background Plane are newly defined as the classes of API of BD-J in the recording/reproducing system of FIG. 1.

(Effects of Extended Classes)

Figure 8:
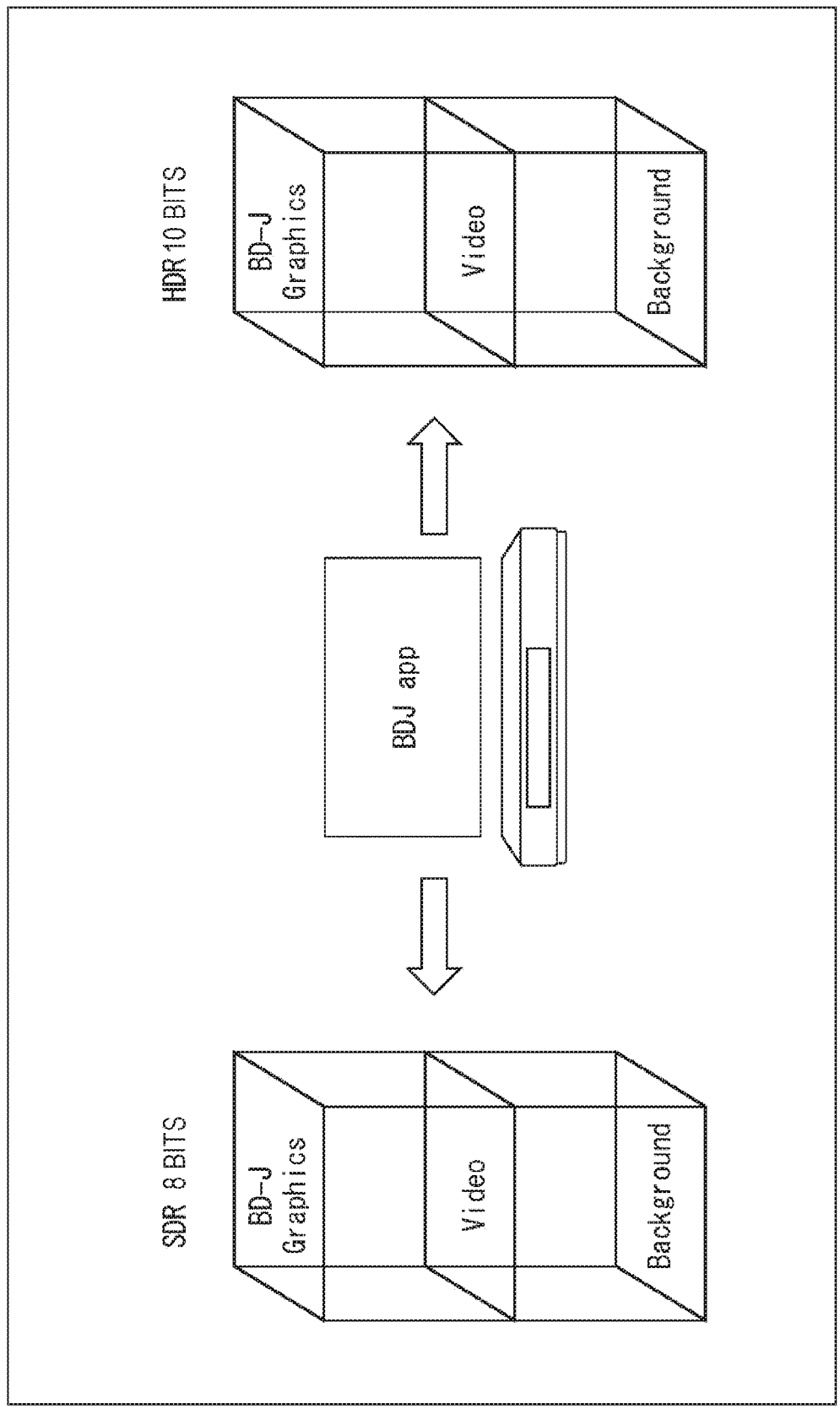
FIG. 8 is a diagram for explaining effects of extended classes of API of BD-J.

FIG. 8 is a diagram for explaining the effects of the extended classes of API of BD-J as illustrated in FIG. 7.

The reproducing apparatus 2 of FIG. 1 executes BD-J using the org.blurayx.uhd.ui#HGraphicsConfigurationTemplateUHD class instead of the org.blurayx.uhd.ui#HGraphicsConfigurationTemplate class thereby to control reproduction of BDJ Graphics Plane.

Specifically, the reproducing apparatus 2 sets a resolution of BDJ Graphics Plane, information on whether BDJ Graphics Plane is a 2D image or 3D image, conversion equation information and maximum luminance information of BDJ Graphics Plane, and the like according to the description using the org.blurayx.uhd.ui#HGraphicsConfigurationTemplateUHD class. Then, the reproducing apparatus 2 collects the set information as information on reproduction of BDJ Graphics Plane to be reproduced according to the description using the org.blurayx.uhd.ui#HGraphicsConfigurationUHD class.

Then, the reproducing apparatus 2 sets the collected information as information on reproduction of BDJ Graphics Plane to be reproduced according to the description using the org.blurayx.uhd.ui#HGraphicsDevice class. The reproducing apparatus 2 controls reproduction of BDJ Graphics Plane on the basis of the information on reproduction of BDJ Graphics Plane to be reproduced.

Similarly, the reproducing apparatus 2 executes BD-J using the org.blurayx.uhd.ui#HVideoConfigurationTemplateUHD class and the org.blurayx.uhd.ui#HBackgroundConfigurationTemplateUHD class thereby to control reproduction of Video Plane and Background Plane.

Thereby, in a case where the dynamic range of BDJ Graphics Plane to be reproduced is HDR and the bit rate thereof is 10 bits, the reproducing apparatus 2 can generate BDJ Graphics Plane with a dynamic range of HDR and a bit rate of 10 bits on the basis of the conversion equation information and the maximum luminance information of the set BDJ Graphics Plane to be reproduced. Similarly, when the dynamic range of Background Plane to be reproduced is HDR, the reproducing apparatus 2 can generate Background Plane with a bit rate of 10 bits.

Consequently, the reproducing apparatus 2 can display a screen made of BDJ Graphics Plane, Video Plane, and Background Plane with a dynamic range of HDR and a bit rate of 10 bits as illustrated in FIG. 8.

Further, in a case where the dynamic range of BDJ Graphics Plane to be reproduced is SDR and the bit rate thereof is 8 bits, the reproducing apparatus 2 generates BDJ Graphics Plane by use of the graphics with a dynamic range of SDR and a bit rate of 8 bits generated by executing BD-J without any change. Similarly, the reproducing apparatus 2 generates Background Plane to be reproduced as graphics with a dynamic range of SDR and a bit rate of 8 bits.

Consequently, the reproducing apparatus 2 can display a screen made of BDJ Graphics Plane, Video Plane, and Background Plane with a dynamic range of SDR and a bit rate of 8 bits as illustrated in FIG. 8.

Note that the present technology is for images, and thus a description of the technology for speeches will be omitted below.

(Exemplary Configuration of Reproducing Apparatus)

Figure 9:
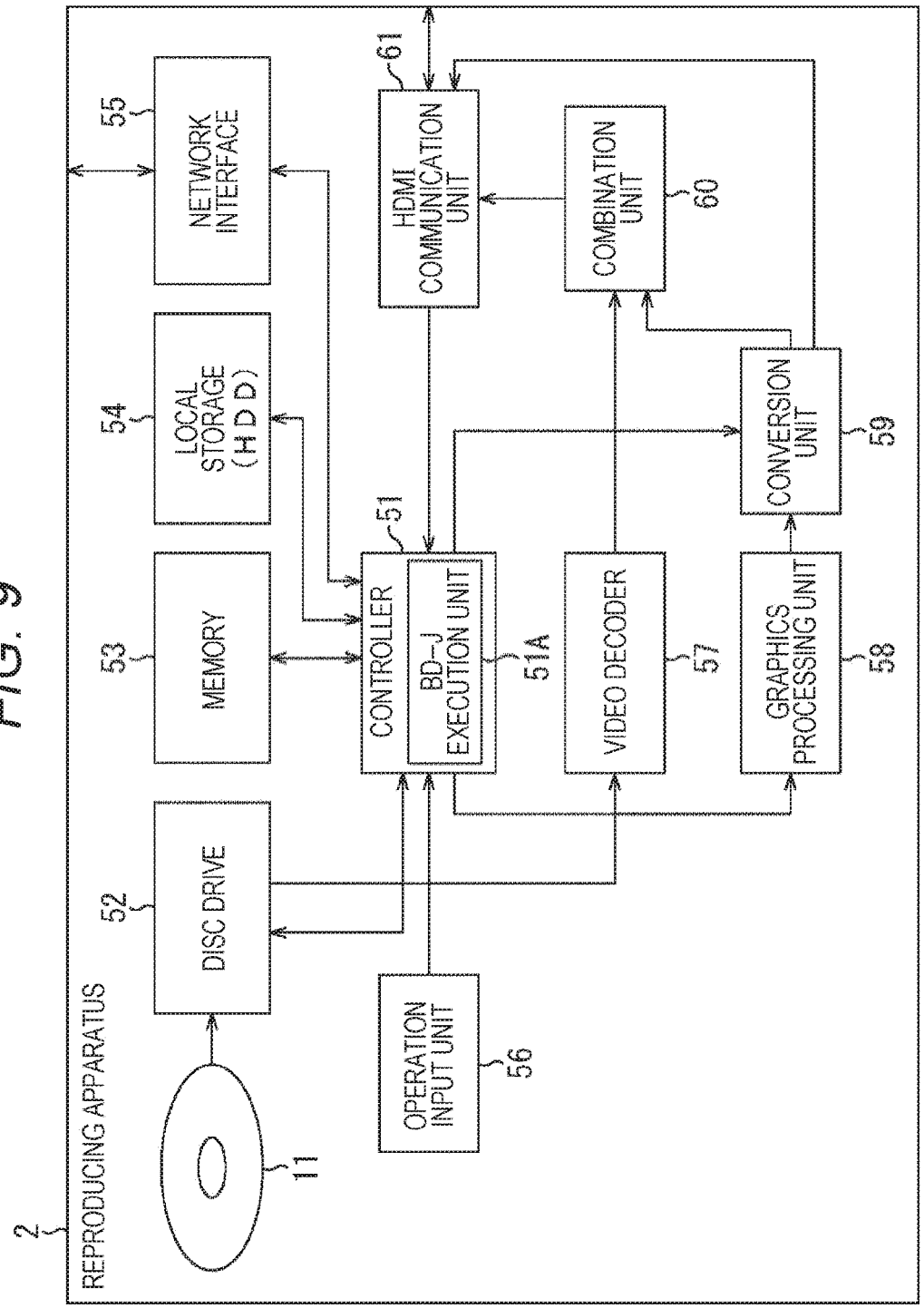
FIG. 9 is a block diagram illustrating an exemplary configuration of a reproducing apparatus of FIG. 1.

FIG. 9 is a block diagram illustrating an exemplary configuration of the reproducing apparatus 2 of FIG. 1.

The reproducing apparatus 2 is configured of a controller 51, a disc drive 52, a memory 53, a local storage 54, a network interface 55, an operation input unit 56, a video decoder 57, a graphics processing unit 58, a conversion unit 59, a combination unit 60, and an HDMI communication unit 61.

The controller 51 is configured of a central processing unit (CPU), a read only memory (ROM), a random access memory (RAM), and the like. The controller 51 executes a predetermined program thereby to control the entire operations of the reproducing apparatus 2 in response to an operation signal or the like from the operation input unit 56.

The CPU in the controller 51 functions as a BD-J execution unit 51A for reading a BDJO file in the optical disc 11 and a JAR file specified by the BDJO file, and executing a file of BD-J incorporated in the JAR file, for example.

The BD-J execution unit 51A sets an initial value of information on reproduction of each plane in a screen to be reproduced, and supplies and stores it in the memory 53 on the basis of TerminalInfo of the BDJO file. For example, the BD-J execution unit 51A sets initial_ETOF included in TerminalInfo as an initial value of conversion equation information of each plane of a screen to be reproduced, and supplies and stores it in the memory 53. In this way, initial_ETOF is set as an initial value of conversion equation information of each plane in a screen to be reproduced, and thus initial_ETOF may be information for instructing to set an initial value of conversion equation information of each plane in a screen to be reproduced.

Further, the BD-J execution unit 51A sets initial_diffuse_white included in TerminalInfo as an initial value of maximum luminance information of each plane in a screen to be reproduced, and supplies and stores it in the memory 53. In this way, initial_diffuse_white is set as an initial value of maximum luminance information of each plane in a screen to be reproduced, and thus initial_diffuse_white may be information for instructing to set an initial value of maximum luminance information of each plane in a screen to be reproduced.

In the present specification, it is assumed that the setting values of the information on reproduction of BDJ Graphics Plane, Video Plane, and Background Plane configuring a screen to be reproduced are the same. Thus, the memory 53 stores the setting value as a currently-set setting value of a screen to be reproduced, but may store a setting value per plane.

The BD-J execution unit 51A executes a file of BD-J thereby to supply a setting value of conversion equation information or maximum luminance information of a screen to be reproduced to the memory 53 and to change the stored conversion equation information or maximum luminance information. Further, the BD-J execution unit 51A executes a file of BD-J thereby to control reproduction of an AV stream on the basis of PlayList and Clip Information supplied from the disc drive 52 or to generate a graphics with a dynamic range of SDR and a bit rate of 8 bits.

Furthermore, the BD-J execution unit 51A executes a file of BD-J thereby to access the local storage 54 or to connect the network interface 55 to a network such as the Internet.

The disc drive 52 reproduces and acquires a file of BD-J from the optical disc 11, and outputs it to the BD-J execution unit 51A, under control of the BD-J execution unit 51A. Further, the disc drive 52 reads PlayList and Clip Information from the optical disc 11 and outputs them to the BD-J execution unit 51A under control of the BD-J execution unit 51A for executing the read file of BD-J. Furthermore, the disc drive 52 reads an AV stream of a main video to be reproduced from the optical disc 11, and outputs it to the video decoder 57, under control of the BD-J execution unit 51A.

The memory 53 stores data and the like required by the controller 51 for executing various types of processing, such as initial values of information on reproduction of conversion equation information and maximum luminance information of a screen to be reproduced supplied from the BD-J execution unit 51A. Further, the memory 53 changes the stored conversion equation information or maximum luminance information to the setting value of the conversion equation information or maximum luminance information of the screen to be reproduced supplied from the BD-J execution unit 51A.

The local storage 54 is configured of a hard disk drive (HDD), for example. The local storage 54 records therein data and the like supplied from the BD-J execution unit 51A, for example, or reads the recorded data and supplies it to the BD-J execution unit 51A.

The network interface 55 is connected to a network such as the Internet under control of the BD-J execution unit 51A. The network interface 55 makes communication with a server via the connected network, and supplies data downloaded from the server to the BD-J execution unit 51A. The data is supplied and recorded in the local storage 54, for example.

The video decoder 57 decodes an AV stream of a main video in a UHD format made of information on reproduction of a currently-set screen to be reproduced supplied from the disc drive 52. The video decoder 57 outputs the main video generated by the decoding to the combination unit 60.

The graphics processing unit 58 (generation unit) generates a graphics with a dynamic range of SDR (sRGB) and a bit rate of 8 bits under control of the BD-J execution unit 51A. The graphics processing unit 58 outputs the generated graphics to the conversion unit 59.

The conversion unit 59 acquires the conversion equation information and the maximum luminance information of the screen to be reproduced from the BD-J execution unit 51A. In a case where the bit rate of the screen to be reproduced is not 8 bits and the dynamic range thereof is not SDR, the conversion unit 59 converts the bit rate and the dynamic range of the graphics supplied from the graphics processing unit 58 such that the luminance of the converted graphics does not exceed the luminance indicated by the maximum luminance information by use of the conversion equation for converting a bit rate and a dynamic range indicated by the conversion equation information. The conversion unit 59 supplies the converted graphics to the combination unit 60.

On the other hand, in a case where the bit rate of the screen to be reproduced is not 8 bits and the dynamic range of the image to be reproduced is SDR, the conversion unit 59 converts only the bit rate of the graphics supplied from the graphics processing unit 58 such that the luminance of the converted graphics does not exceed the luminance indicated by the maximum luminance information by use of the conversion equation for converting a bit rate indicated by the conversion equation information, and supplies it to the combination unit 60.

Further, in a case where the bit rate of the screen to be reproduced is 8 bits and the dynamic range of the image to be reproduced is SDR, the conversion unit 59 supplies the graphics supplied from the graphics processing unit 58 to the combination unit 60 as it is.

The combination unit 60 combines the main video supplied from the video decoder 57 with the graphics supplied from the graphics processing unit 58. The combination unit 60 outputs a combined image obtained by the combination to the HDMI communication unit 61.

The HDMI communication unit 61 makes communication with the display apparatus 3 via the HDMI cable 4. For example, the HDMI communication unit 61 outputs the combined image supplied from the combination unit 60 to the display apparatus 3 of FIG. 1.

(Exemplary Configuration of Conversion Setting Unit)

Figure 10:
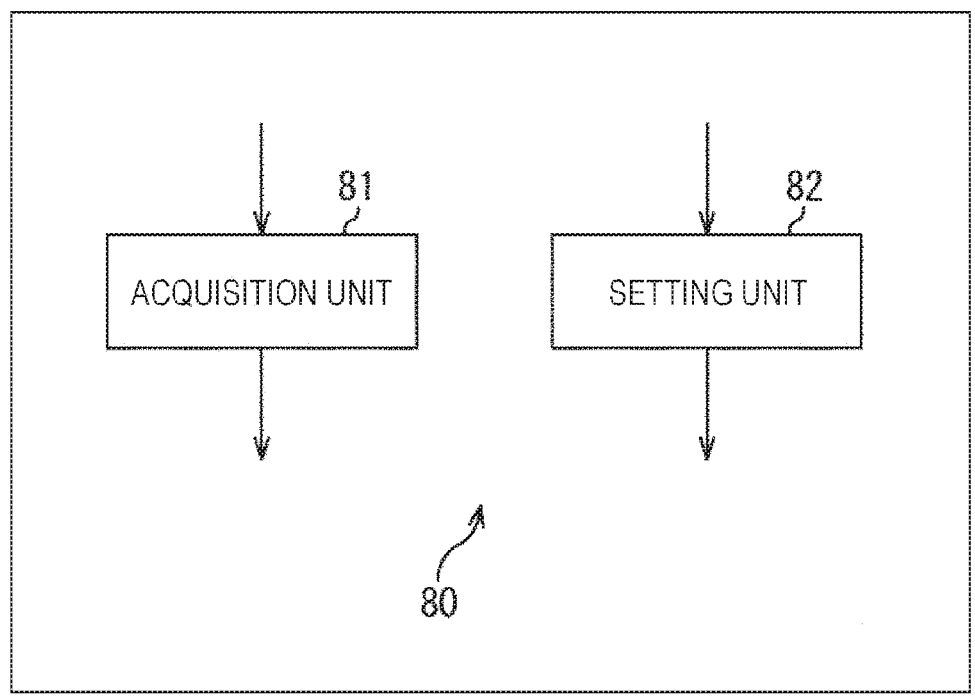
FIG. 10 is a block diagram illustrating an exemplary configuration of a conversion setting unit.

FIG. 10 is a block diagram illustrating an exemplary configuration of the conversion setting unit for setting conversion equation information and maximum luminance information of BD-J Graphics Plane to be reproduced realized by the BD-J execution unit 51A of FIG. 9.

The conversion setting unit 80 is configured of an acquisition unit 81 and a setting unit 82 as illustrated in FIG. 10.

The acquisition unit 81 executes the getPreference (EOTF) function described in the file of BD-J by use of the org.blurayx.uhd.ui#HGraphicsConfigurationTemplateUHD class thereby to acquire the EOTF type indicated by the conversion equation information of BD-J Graphics Plane to be reproduced stored in the memory 53 in the expression of the org.blurayx.uhd.ui#EOTF class. The acquisition unit 81 supplies the conversion unit 59 with the conversion equation information on the EOTF type indicated by the acquired org.blurayx.uhd.ui#EOTF#Gammma or org.blurayx.uhd.ui#EOTF#PQ.

Further, the acquisition unit 81 executes the getDiffuseWhite ( ) function described in the file of BD-J by use of the org.blurayx.uhd.ui#HGraphicsConfigurationTemplateUHD class thereby to acquire the maximum luminance information of BD-J Graphics Plane to be reproduced stored in the memory 53. The acquisition unit 81 supplies the acquired maximum luminance information to the conversion unit 59.

The setting unit 82 acquires initial_EOTF included in TerminalInfo in the BDJO file with the title to be reproduced, and sets the initial value indicated by initial_EOTF for the conversion equation information of BD-J Graphics Plane to be reproduced. Further, the setting unit 82 executes the setPreference (EOTF, EOTF#Gamma/#PQ, REQUIRED) function described in the file of BD-J by use of the org.blurayx.uhd.ui#HGraphicsConfigurationTemplateUHD class thereby to acquire and set the setting value indicated by "EOTF#Gamma/#PQ" for the conversion equation information of BD-J Graphics Plane to be reproduced.

Further, the setting unit 82 acquires initial_diffuse_white included in TerminalInfo in the BDJO file with the title to be reproduced, and sets the initial value indicated by initial_diffuse_white for the maximum luminance information of BD-J Graphics Plane to be reproduced. Further, the setting unit 82 executes the setDiffusewhite (float diffusewhite) function described in the file of BD-J by use of the org.blurayx.uhd.ui#HGraphicsConfigurationTemplateUHD class thereby to acquire and set "float diffusewhite" for the maximum luminance information of BD-J Graphics Plane to be reproduced. The setting unit 82 supplies and stores the set conversion equation information and maximum luminance information of BD-J Graphics Plane to be reproduced in the memory 53.

(Description of Graphics Conversion Processing)

Figure 11:
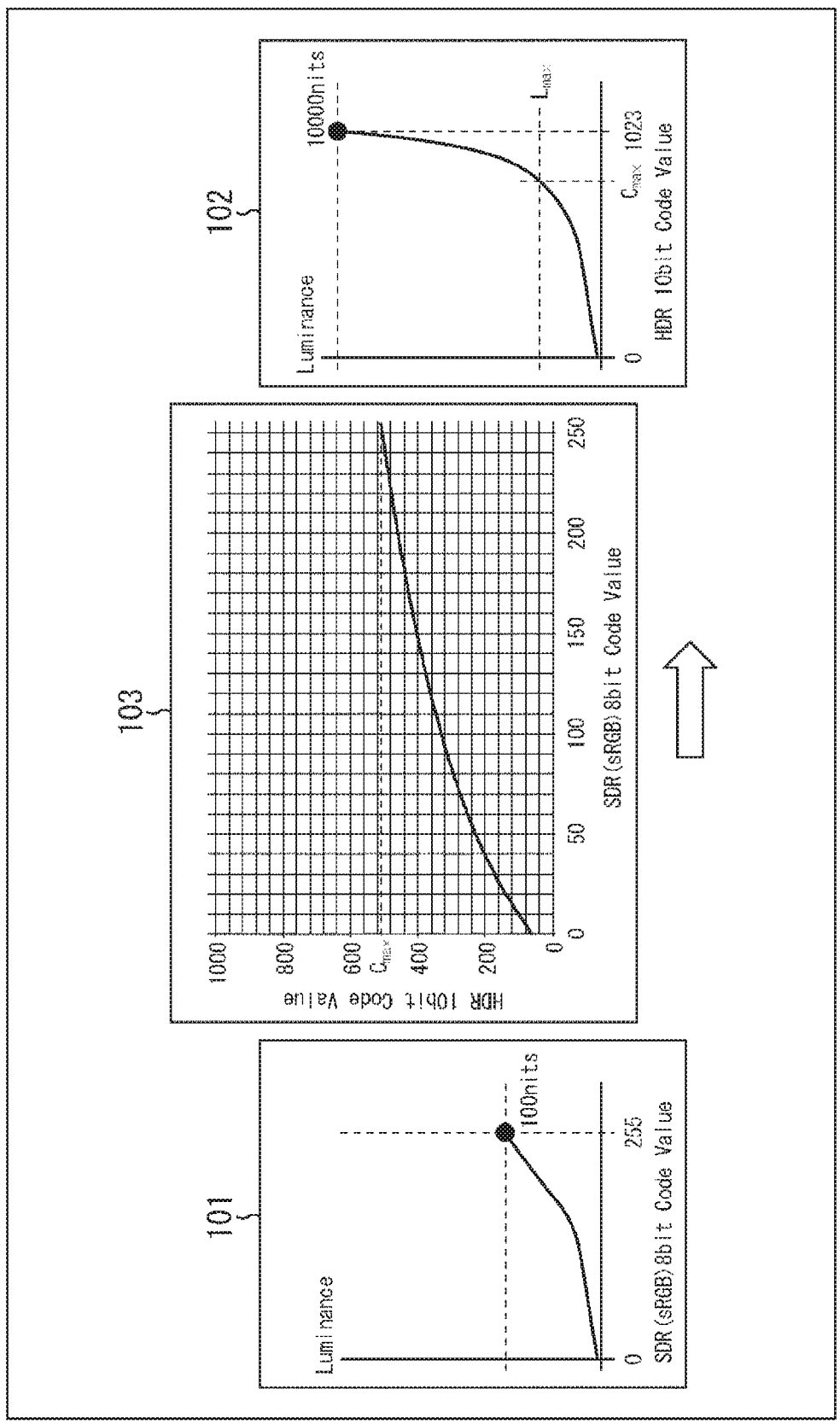
FIG. 11 is a diagram for explaining a graphics conversion processing by a conversion unit of FIG. 9.

FIG. 11 is a diagram for explaining a graphics conversion processing by the conversion unit 59 of FIG. 9.

Incidentally, in the example of FIG. 11, the bit rate of BD-J Graphics Plane to be reproduced is 10 bits, and the dynamic range thereof is HDR.

A relationship between pixel value and luminance of an image with a dynamic range of SDR (sRGB) and a bit rate of 8 bits is as illustrated in a graph 101 of FIG. 11, for example. Incidentally, in the graph 101, the horizontal axis indicates a pixel value (SDR (sRGB) 8 bit Code Value) of an image with a dynamic range of SDR (sRGB) and a bit rate of 8 bits, and the vertical axis indicates luminance. The maximum luminance for SDR is 100 nit as illustrated in the graph 101.

Further, a relationship between pixel value and luminance of an image with a dynamic range of HDR and a bit rate of 10 bits is as illustrated in a graph 102. Incidentally, in the graph 102, the horizontal axis indicates a pixel value (HDR 10 bit Code Value) of an image with a dynamic range of HDR and a bit rate of 10 bits, and the vertical axis indicates luminance. The maximum luminance for HDR is assumed at 10000 nit in the example of FIG. 11, but is not limited thereto.

The conversion unit 59 converts a graphics having the relationship of the graph 101 into a graphics having the relationship of the graph 102. At this time, the conversion unit 59 acquires, as the maximum luminance information of BD-J Graphics Plane to be reproduced, a value $((L_{max}/10000)*100)$ obtained by dividing the maximum luminance $L_{max}$ of BD-J Graphics Plane to be reproduced by the maximum luminance of 10000 nit for HDR and multiplying the quotient by 100.

The conversion unit 59 then converts the graphics by use of the conversion equation generated by using the EOTF type indicated by the conversion equation information of BD-J Graphics Plane to be reproduced such that the maximum value of 255 of the pixel value of the non-converted graphics takes a pixel value $C_{max}$ corresponding to the maximum luminance $L_{max}$ of the converted graphics.

That is, a relationship between pixel value of the non-converted graphics and pixel value of the converted graphics in the conversion equation is as illustrated in a graph 103. Incidentally, in the graph 103, the horizontal axis indicates a pixel value of the non-converted graphics, and the vertical axis indicates a pixel value of the converted graphics. For example, in a case where the maximum luminance information is 73, the maximum luminance $L_{max}$ is 7300 nit, and the luminance of the pixels of the graphics of which luminance is 100 nit before being converted changes to 7300 nit after being converted.

(Description of Processing by Reproducing Apparatus)

Figure 12:
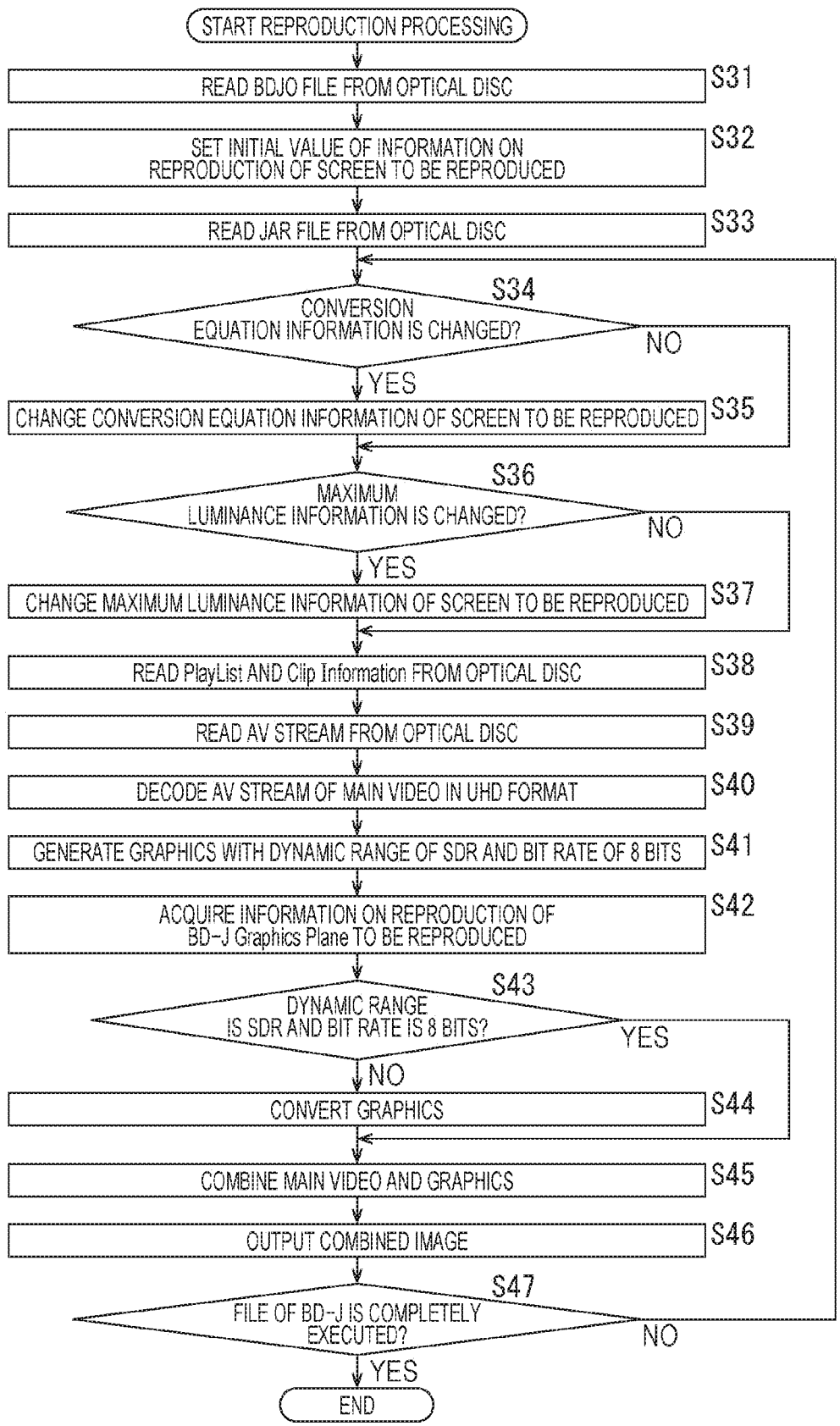
FIG. 12 is a flowchart for explaining a reproduction processing by the reproducing apparatus of FIG. 9.
Figure 13:
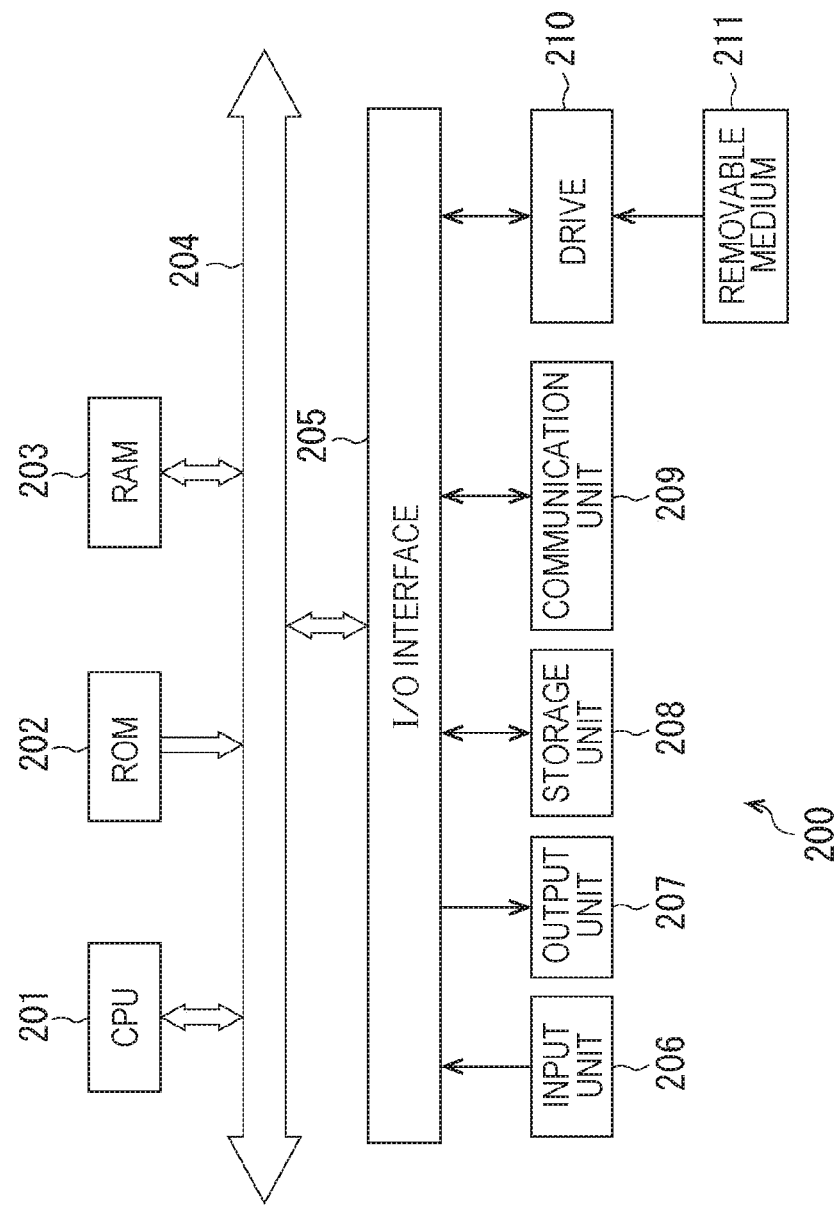
FIG. 13 is a block diagram illustrating an exemplary hardware configuration of a computer.

FIG. 12 is a flowchart for explaining a reproduction processing by the reproducing apparatus 1 of FIG. 9.

In step S31 in FIG. 12, the disc drive 52 reads a BDJO file with a title to be reproduced from the optical disc 11 and outputs it to the BD-J execution unit 51A under control of the controller 51.

In step S32, the BD-J execution unit 51A sets an initial value of information on reproduction of each plane in a screen to be reproduced, and supplies and stores it in the memory 53, on the basis of TerminalInfo of the BDJO file supplied from the disc drive 52.

For example, the setting unit 82 (FIG. 10) in the BD-J execution unit 51A sets the initial value indicated by initial_EOTF included in TerminalInfo for the conversion equation information of BD-J Graphics Plane to be reproduced, and supplies and stores it in the memory 53. Further, the setting unit 82 sets the initial value indicated by initial_diffuse_white included in TerminalInfo for the maximum luminance information of BD-J Graphics Plane to be reproduced, and supplies and stores it in the memory 53.

In step S33, the disc drive 52 reads a JAR file with a title to be reproduced from the optical disc 11, and outputs it to the BD-J execution unit 51A, under control of the BD-J execution unit 51A based on the BDJO file.

In step S34, the setting unit 82 in the BD-J execution unit 51A determines whether to change the conversion equation information of BD-J Graphics Plane to be reproduced according to a file of BD-J incorporated in the JAR file. Specifically, the setting unit 82 determines whether the setPreference(EOTF, EOTF#Gamma, REQUIRED) function or the setPreference(EOTF, EOTF#PQ, REQUIRED) function is to be currently executed in the file of BD-J. Incidentally, in the processing in the first step S34, it is assumed that a description at the head of the file of BD-J is to be currently executed.

In a case where the setPreference (EOTF, EOTF#Gamma, REQUIRED) function or the setPreference(EOTF, EOTF#PQ, REQUIRED) function is to be currently executed in the file of BD-J, in step S34, the setting unit 82 determines to change the conversion equation information of BD-J Graphics Plane to be reproduced. The processing then proceeds to step S35.

In step S35, the setting unit 82 executes the function to be currently executed in the file of BD-J thereby to change the conversion equation information of BD-J Graphics Plane to be reproduced.

Specifically, in a case where the setPreference (EOTF, EOTF#Gamma, REQUIRED) function is to be currently executed in the file of BD-J, the setting unit 82 changes the conversion equation information stored in the memory 53 into 0 for Gammma. On the other hand, in a case where the setPreference (EOTF, EOTF#PQ, REQUIRED) function is to be currently executed in the file of BD-J, the setting unit 82 changes the conversion equation information stored in the memory 53 to 1 for PQ. After the change of the conversion equation information, a next description is to be currently executed, and the processing proceeds to step S36.

On the other hand, in a case where the setPreference (EOTF, EOTF#Gamma, REQUIRED) function and the setPreference(EOTF, EOTF#PQ, REQUIRED) function are not to be currently executed in the file of BD-J, in step S35, the setting unit 82 determines not to change the conversion equation information of BD-J Graphics Plane to be reproduced. The processing then proceeds to step S36.

In step S36, the setting unit 82 determines whether to change the maximum luminance information of BD-J Graphics Plane to be reproduced according to the file of BD-J. Specifically, the setting unit 82 determines whether the setDiffusewhite(float diffusewhite) function is to be currently executed in the file of BD-J.

In a case where the file of BD-J is currently executing the setDiffusewhite(float diffusewhite) function, in step S36, the setting unit 82 determines to change the maximum luminance information of BD-J Graphics Plane to be reproduced. The processing then proceeds to step S37.

In step S37, the setting unit 82 executes the function to be currently executed in the file of BD-J thereby to change the maximum luminance information of BD-J Graphics Plane to be reproduced to "float diffusewhite." After the change of the maximum luminance information, a next description is to be currently executed in the file of BD-J, and the processing proceeds to step S38.

On the other hand, in a case where the setDiffusewhite (float diffusewhite) function is not to be currently executed in the file of BD-J, in step S36, the setting unit 82 determines not to change the maximum luminance information of BD-J Graphics Plane to be reproduced. The processing then proceeds to step S38.

In step S38, the disc drive 52 reads PlayList and Clip Information to be reproduced from the optical disc 11, and outputs them to the BD-J execution unit 51A, under control of the BD-J execution unit 51A executing a current subject. The BD-J execution unit 51A controls reproduction of an AV stream on the basis of PlayList and Clip Information supplied from the disc drive 52. The BD-J execution unit 51A then moves to a next description to be currently executed in the file of BD-J.

In step S39, the disc drive 52 reads an AV stream to be reproduced from the optical disc 11 and outputs it to the video decoder 57 under control of the BD-J execution unit 51A.

In step S40, the video decoder 57 decodes the AV stream of the main video in the UHD format made of the information on reproduction of Video Plane to be reproduced, which is supplied from the disc drive 52, and outputs the resultant main video to the combination unit 60.

In step S41, the graphics processing unit 58 generates a graphics with a dynamic range of SDR and a bit rate of 8 bits and outputs it to the conversion unit 59 under control of the BD-J execution unit 51A executing a current subject to be executed in the file of BD-J. A next description is then to be currently executed in the file of BD-J.

In step S41, the BD-J execution unit 51A executes the current subject to be executed in the file of BD-J thereby to acquire and supply the information on reproduction of BD-J Graphics Plane to be reproduced to the conversion unit 59.

For example, the acquisition unit 81 (FIG. 10) in the BD-J execution unit 51A executes the getPreference (EOTF) function to be currently executed in the file of BD-J thereby to acquire org.blurayx.uhd.ui#EOTF#Gammma or org.blurayx.uhd.ui#EOTF#PQ on the EOTF type indicated by the conversion equation information of BD-J Graphics Plane to be reproduced stored in the memory 53. The acquisition unit 81 then supplies the conversion unit 59 with the conversion equation information on the EOTF type indicated by the acquired org.blurayx.uhd.ui#EOTF#Gammma or org.blurayx.uhd.ui#EOTF#PQ, and a next description is to be currently executed in the file of BD-J.

Further, the acquisition unit 81 executes the getDiffuse( ) function to be currently executed in the file of BD-J thereby to acquire the maximum luminance information of BD-J Graphics Plane to be reproduced stored in the memory 53. The acquisition unit 81 then supplies the maximum luminance information to the conversion unit 59, and a next description is to be currently executed in the file of BD-J.

In step S43, the conversion unit 59 determines whether the dynamic range is SDR and the bit rate is 8 bits in the information on reproduction acquired in step S42.

In step S43, in a case where it is determined that the dynamic range is not SDR or the bit rate is not 8 bits, the processing proceeds to step S44.

In step S44, the conversion unit 59 converts the bit rate or the dynamic range of the graphics by use of the conversion equation generated by using the EOTF type indicated by the conversion equation information in the acquired information on reproduction such that the luminance of the converted graphics does not exceed the luminance indicated by the maximum luminance information. The conversion unit 59 supplies the combination unit 60 with the graphics in the UHD format of the main video acquired by the conversion, and the processing proceeds to step S45.

On the other hand, in step S43, in a case where it is determined that the dynamic range is SDR and the bit rate is 8 bits, the conversion unit 59 supplies the combination unit 60 with the graphics supplied from the graphics processing unit 58 without any change as graphics in the UHD format of the main video. The processing then proceeds to step S45.

In step S45, the combination unit 60 combines the main video supplied from the video decoder 57 with the graphics supplied from the conversion unit 59 thereby to generate a combined image. In step S46, the combination unit 60 outputs the combined image to the display apparatus 3 via the HDMI communication unit 61.

In step S47, the BD-J execution unit 51A determines whether the file of BD-J is completely executed or the last description in the file of BD-J was to be executed. In step S47, in a case where it is determined that the file of BD-J is not completely executed, a next description is to be currently executed in the file of BD-J, and the processing returns to step S34. Then the series of processing in steps S34 to S47 is repeatedly performed until the file of BD-J is completely executed.

On the other hand, in step S47, in a case where it is determined that the file of BD-J is completely executed, the processing ends.

Note that, in the reproduction processing in FIG. 12, in the file of BD-J, the description for instructing to change the conversion equation information or the maximum luminance information is executed before the description for instructing reproduction according to PlayList, and the description for instructing to acquire the conversion equation information or the maximum luminance information is executed after the description for instructing reproduction according to PlayList. However, the positions of the descriptions for instructing to change and acquire conversion equation information and maximum luminance information of a screen to be reproduced are not limited thereto, and may be at positions desired by the author of the contents.

As described above, the reproducing apparatus 2 can set the conversion equation information of BD-J Graphics Plane to be reproduced, and can convert at least the bit rate of the graphics by use of the conversion equation indicated by the set conversion equation information. Thereby, the reproducing apparatus 2 can change at least the bit rate of BD-J Graphics Plane to be reproduced. Further, in a case where the conversion equation information indicates a conversion equation for converting a bit rate and a dynamic range, the reproducing apparatus 2 can convert not only the bit rate but also the dynamic range.

Further, the reproducing apparatus 2 sets the maximum luminance information of BD-J Graphics Plane to be reproduced and uses the set maximum luminance information for converting the graphics. Thereby, the maximum luminance of the converted graphics can be set at luminance desired by the author of the contents.

<Second Embodiment>

(Description of Computer to which Present Disclosure is Applied)

A series of processing described above can be executed in hardware or can be executed in software. In a case where the series of processing is executed in software, the programs configuring the software are installed in a computer. Herein, the computer may be a computer incorporated in dedicated hardware, a general-purpose personal computer capable of executing various functions by installing various programs therein, or the like, for example.

FIG. 13 is a block diagram illustrating an exemplary hardware configuration of a computer for executing the series of processing described above by the programs.

In a computer 200, a central processing unit (CPU) 201, a read only memory (ROM) 202, and a random access memory (RAM) 203 are mutually connected via a bus 204.

The bus 204 is further connected with an I/O interface 205. The I/O interface 205 is connected with an input unit 206, an output unit 207, a storage unit 208, a communication unit 209, and a drive 210.

The input unit 206 is configured of a keyboard, mouse, microphone, and the like. The output unit 207 is configured of a display, speaker, and the like. The storage unit 208 is configured of a hard disc, nonvolatile memory, and the like. The communication unit 209 is configured of a network interface and the like. The drive 210 drives a removable medium 211 such as magnetic disc, optical disc, magneto-optical disc, or semiconductor memory.

In the thus-configured computer 200, the CPU 201 loads and executes the programs stored in the storage unit 208 into the RAM 203 via the I/O interface 205 and the bus 204, for example, so that the series of processing described above is performed.

The programs executed by the computer 200 (the CPU 201) can be recorded and provided in the removable medium 211 as package medium or the like, for example. Further, the programs can be provided via a wired or wireless transmission medium such as a local area network, the Internet or digital satellite broadcasting.

In the computer 200, the removable medium 211 is mounted on the drive 210 so that the programs can be installed in the storage unit 208 via the I/O interface 205. Further, the programs can be received by the communication unit 209 and installed in the storage unit 208 via a wired or wireless transmission medium. Additionally, the programs can be previously installed in the ROM 202 or the storage unit 208.

Incidentally, the programs executed by the computer 200 may be a program by which the series of processing is performed in time series in the order described in the present specification or a program by which the series of processing is performed in parallel or at necessary timings such as on calling.

Further, in the present specification, a system indicates a set of components (such as apparatuses and modules (parts)), and all the components may or may not be in the same casing. Thus, a system may be a plurality of apparatuses housed in separate casings and connected via a network, and an apparatus in which a plurality of modules are housed in one casing.

The effects described in the present specification are merely exemplary and not restrictive, and other effect may be obtained.

Further, embodiments of the present disclosure are not limited to the embodiments described above, and may be variously changed without departing from the spirit of the present disclosure.

For example, the first and second embodiments assume that two bit rates of 8 bits and 10 bits are employed, but three or more bit rates may be employed. Similarly, three or more types of color gamut may be employed, not limited to two types of color gamut of BT.709 and BT.2020.

Further, an initial value of conversion equation information or maximum luminance information may be previously determined and may not be described in TerminalInfo. Furthermore, either conversion equation information or maximum luminance information may be set and acquired. In this case, the other takes a preset fixed value.

Moreover, contents may be provided via a broadcasting wave or network. In this case, the present disclosure can be applied to a set top box or TV receiver for receiving a broadcasting wave, a personal computer for exchanging data via a network, and the like.

Additionally, the present disclosure can employ the following configurations.

(1)

An information processing apparatus including:

a setting unit configured to set conversion equation information indicating a conversion equation for converting at least a bit rate of an image to be reproduced; and a conversion unit configured to convert at least a bit rate of the image to be reproduced by use of the conversion equation indicated by the conversion equation information set by the setting unit.

(2)

The information processing apparatus according to (1), wherein the conversion equation is directed for converting the bit rate and a dynamic range of the image to be reproduced, and the conversion unit is configured to convert the bit rate and the dynamic range of the image to be reproduced.

(3)

The information processing apparatus according to (1) or (2), wherein the setting unit is configured to acquire and set an initial value of the conversion equation information.

(4)

The information processing apparatus according to any of (1) to (3), wherein the setting unit is configured to acquire and set a setting value of the conversion equation information.

(5)

The information processing apparatus according to (4), wherein the setting unit executes blu-ray disc Java (BD-J) using a class of application programming interface (API) of BD-J for instructing to set the setting value thereby to set the setting value.

(6)

The information processing apparatus according to (5), wherein the class is configured to have a function of an HGraphicsConfigurationTemplate class.

(7)

The information processing apparatus according to any of (1) to (6), further including:

an acquisition unit configured to acquire the conversion equation information set by the setting unit by executing blu-ray disc Java (BD-J) using a class of application programming interface (API) of BD-J for instructing to acquire the conversion equation information set by the setting unit.

(8)

The information processing apparatus according to (7), wherein the acquisition unit is configured to acquire the conversion equation information in an expression of a class of application programming interface (API) of blu-ray disc Java (BD-J) expressing a plurality of items of the conversion equation information.

(9)

The information processing apparatus according to any of (1) to (8), wherein the setting unit is configured to set maximum luminance information indicating maximum luminance of the image to be reproduced, which is converted by the conversion unit, and the conversion unit is configured to perform the conversion such that luminance of the image to be reproduced, which is converted by the conversion unit, does not exceed luminance indicated by the maximum luminance information.

(10)

The information processing apparatus according to (9), wherein the setting unit is configured to acquire and set an initial value of the maximum luminance information.

(11)

The information processing apparatus according to (9) or (10), wherein the setting unit is configured to acquire and set a setting value of the maximum luminance information.

(12)

The information processing apparatus according to (11), wherein the setting unit executes blu-ray disc Java (BD-J) using a class of application programming interface (API) of BD-J for instructing to set the setting value thereby to set the setting value.

(13)

The information processing apparatus according to (12), wherein the class is configured to have a function of an HGraphicsConfigurationTemplate class.

(14)

The information processing apparatus according to any of (9) to (13), further including:

an acquisition unit configured to acquire the maximum luminance information set by the setting unit by executing blu-ray disc Java (BD-J) using a class of application programming interface (API) of BD-J for instructing to acquire the maximum luminance information set by the setting unit.

(15)

An information processing method performed by an information processing apparatus, including:

a setting step of setting conversion equation information on a conversion equation for converting at least a bit rate of an image to be reproduced; and a conversion step of converting at least the bit rate of the image to be reproduced by use of the conversion equation indicated by the conversion equation information set in processing in the setting step.

(16)

A program for causing a computer to function as:

a setting unit configured to set conversion equation information indicating a conversion equation for converting at least a bit rate of an image to be reproduced; and a conversion unit configured to convert at least the bit rate of the image to be reproduced by use of the conversion equation indicated by the conversion equation information set by the setting unit.

(17)

A recording medium which records therein information for instructing to set conversion equation information indicating a conversion equation for converting at least a bit rate of an image to be reproduced, is mounted on an information processing apparatus, and is reproduced, the recording medium causing the information processing apparatus having acquired the information to set the conversion equation information of the image to be reproduced and to convert at least the bit rate of the image to be reproduced by use of the conversion equation indicated by the set conversion equation information.

(18)

An information processing apparatus including:

a generation unit configured to generate a file including information for instructing to set conversion equation information indicating a conversion equation for converting at least a bit rate of an image to be reproduced.

REFERENCE SIGNS LIST

1 Recording apparatus
2 Reproducing apparatus
11 Optical disc
59 Conversion unit
81 Acquisition unit
82 Setting unit

The invention claimed is:

1. An information processing apparatus, comprising:
circuitry configured to:
execute Blu-ray disc Java (BD-J) based on a class of an application programming interface (API) of the BD-J;
acquire conversion equation information based on the execution of the BD- J, wherein the conversion equation information indicates a type of electro-optical transfer function (EOTF) of a screen;
set a setting value of the acquired conversion equation information;
generate a conversion equation for a conversion of at least a bit rate of an image to be reproduced, wherein the conversion equation is generated based on the setting value of the conversion equation information and the EOTF of the screen; and
convert at least the bit rate of the image to be reproduced based on the generated conversion equation.

2. The information processing apparatus according to claim 1, wherein
the conversion equation is directed for the conversion of the bit rate and a dynamic range of the image, and
the circuitry is further configured to convert the bit rate and the dynamic range of the image.

3. The information processing apparatus according to claim 1,
wherein the circuitry is further configured to acquire and set an initial value of the conversion equation information.

4. The information processing apparatus according to claim 1, wherein
the BD-J is executed to set the setting value.

5. The information processing apparatus according to claim 4, wherein the class is configured to have a function of an HGraphicsConfigurationTemplate class.

6. The information processing apparatus according to claim 1, wherein
the circuitry is further configured to acquire the conversion equation information in an expression of the class of the API of the BD-J, and
the BD-J indicates a plurality of items of the conversion equation information.

7. The information processing apparatus according to claim 1, wherein the circuitry is further configured to:
acquire maximum luminance information;
set the maximum luminance information indicating maximum luminance of the image; and
convert a luminance of the image, such that the luminance of the image does not exceed a luminance indicated by the maximum luminance information.

8. The information processing apparatus according to claim 7, wherein the circuitry is further configured to acquire and set an initial value of the maximum luminance information.

9. The information processing apparatus according to claim 7, wherein the circuitry is further configured to set a setting value of the maximum luminance information.

10. The information processing apparatus according to claim 9, wherein
the circuitry is further configured to execute the BD-J based on the class of the API of the BD-J, and
the BD-J is executed to set the setting value.

11. The information processing apparatus according to claim 10, wherein the class is configured to have a function of an HGraphicsConfigurationTemplate class.

12. The information processing apparatus according to claim 7, wherein the circuitry is further configured to
acquire the maximum luminance information based on the execution of the BD-J.

13. The information processing apparatus according to claim 1, wherein the circuitry is further configured to execute a function to set the setting value indicated by a parameter of the function.

14. An information processing method, comprising:
in an information processing apparatus:
executing Blu-ray disc Java (BD-J) based on a class of an application programming interface (API) of the BD-J;
acquiring conversion equation information based on the execution of the BD-J, wherein the conversion equation information indicates a type of electro-optical transfer function (EOTF) of a screen;
setting a setting value of the acquired conversion equation information;

generating a conversion equation for converting at least a bit rate of an image to be reproduced, wherein the conversion equation is generated based on the setting value of the conversion equation information and the EOTF of the screen; and converting at least the bit rate of the image to be reproduced based on the generated conversion equation.

15. A non-transitory computer-readable medium having stored thereon, computer-executable instructions, which when executed by a processor of an information processing apparatus, cause the processor to execute operations, the operations comprising:

executing Blu-ray disc Java (BD-J) based on a class of an application programming interface (API) of the BD-J;

acquiring conversion equation information based on the execution of the BD-J, wherein the conversion equation information indicates a type of electro-optical transfer function (EOTF) of a screen;

setting a setting value of the acquired conversion equation information;

generating a conversion equation for converting at least a bit rate of an image to be reproduced, wherein the conversion equation is generated based on the setting value of the conversion equation information and the EOTF of the screen; and converting at least the bit rate of the image to be reproduced based on the generated conversion equation.

16. An information processing apparatus, comprising: circuitry configured to:

execute Blu-ray disc Java (BD-J) based on a class of an application programming interface (API) of the BD-J;

acquire information to set a setting value of conversion equation information,
wherein the setting value is set based on the execution of the BD-J;

generate a conversion equation for conversion of at least a bit rate of an image to be reproduced,
wherein the conversion equation is generated based on the setting value of the conversion equation information; and convert the at least the bit rate of the image to be reproduced based on the generated conversion equation.

17. An information processing apparatus, comprising:
circuitry configured to:

execute Blu-ray disc Java (BD-J) based on a class of an application programming interface (API) of the BD-J;

acquire conversion equation information based on the execution of the BD-J, wherein the conversion equation information indicates a type of electro-optical transfer function (EOTF) of a screen;

set a setting value of the acquired conversion equation information,
wherein the setting value is set based on the execution of the BD-J;

generate a conversion equation for a conversion of at least a bit rate of an image to be reproduced, wherein the conversion equation is generated based on the setting value of the conversion equation information; and convert at least the bit rate of the image to be reproduced based on the generated conversion equation.

* * * * *